D. T. PRAY.
Lubricators.
No. 141,168. Patented July 22, 1873.
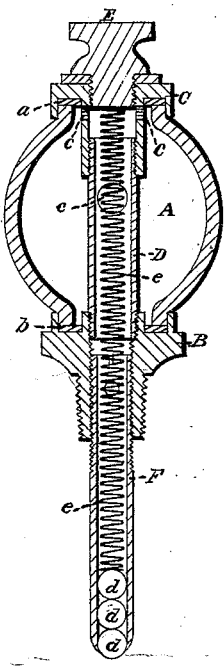
WITNESSES.
N. C. Lombard
S. A. Strong
INVENTOR.
David T. Pray.

UNITED STATES PATENT OFFICE.

DAVID T. PRAY, OF BOSTON, MASSACHUSETTS.

IMPROVEMENT IN LUBRICATORS.

Specification forming part of Letters Patent No. 141,168, dated July 22, 1873; application filed April 12, 1873.

*To all whom it may concern:*

Be it known that I, DAVID T. PRAY, of Boston, in the county of Suffolk and State of Massachusetts, have invented certain new and useful Improvements in Self-Feeding Oil-Cups, of which the following, taken in connection with the accompanying drawings, is a specification:

My invention relates to that class of oil-cups in which the flow of oil is caused by the action of the shaft upon a controlling-valve or check, which prevents or materially retards the flow of oil when the shaft is in a state of rest, but allows it to flow at the requisite speed when the shaft is in motion; and it consists in a tube leading from the oil-cup to, or nearly to, the periphery of the journal to be supplied with oil, and containing one or more balls, placed one above the other when more than one is used, the lower one resting upon the periphery of the journal, and rotated by the action of the revolving journal thereon, the flow of oil to the journal being regulated by increasing or diminishing the number of balls in said tube. It further consists in the use, in combination with said ball-valves and their inclosing-tube, of a light spring, acting upon said balls to prevent them from being displaced by any sudden jar or motion of the machine, and, particularly, to keep the balls in place when the oil-cup is used on a loose pulley.

The drawing shown represents a vertical section of my improved oil-cup, in which—

A is the oil-receptacle, which may be made of metal or glass, though the latter is preferable for most uses, and firmly secured between the base B and cap C, which are connected together by the tube D, provided with a screw-thread at either end, the joints between the oil-chamber A and the base B and cap C being made oil-tight by means of the packing *a* and *b*, made of cork, leather, or other suitable material; the oil to be supplied to the chamber by removing the plug E, and finds its way to the interior of the tube D through the holes *c c*, and thence, through the tube F, screwed into the underside of the base B, to the balls *d d d*. The tube F is made and adjusted to the proper length to allow the periphery of the lower ball to rest upon the periphery of the journal to be oiled. A light spiral spring, *e*, is placed in the tubes D and F, one end of which rests upon the upper ball, and the other end bears against the plug E, said spring being of sufficient strength or tension to insure the holding the balls *d d* in contact with each other and with the journal in an obvious manner.

When the journal or pulley is set in motion the balls *d d* are rotated, and a small amount of oil will pass through the mouth of the tube F, and be deposited upon the journal at each revolution of the balls as long as the shaft or pulley is kept in motion; but when the motion of the shaft ceases the flow of oil will cease.

What I claim as new, and desire to secure by Letters Patent of the United States, is—

1. In a self-feeding oil-cup for supplying oil to a rotating or sliding bearing for purposes of lubrication, one or more spherical valves, *d d*, for checking or controlling the flow of oil, when arranged to be rotated by the movement of the bearing, substantially as described.

2. The combination of the ball-valves *d d* and the tube F with the oil-reservoir A, arranged substantially as described, for the purpose specified.

3. The combination, with the oil-reservoir A, of the ball-valves *d d* and the spring *e*, arranged and operating as described, for the purpose specified.

Executed at Boston this 7th day of April, 1873.

DAVID T. PRAY.

Witnesses:
 N. C. LOMBARD,
 S. A. WOOD.